United States Patent Office 3,570,003
Patented Mar. 9, 1971

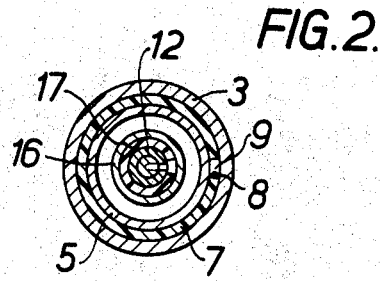
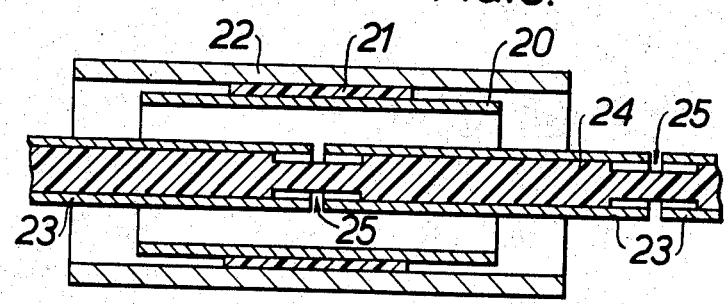
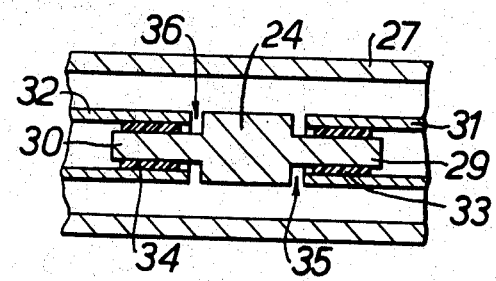
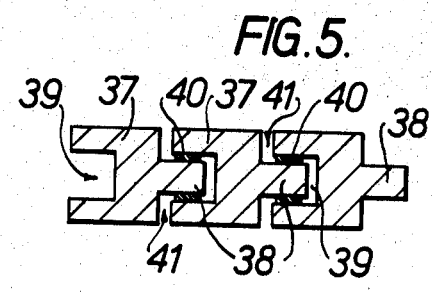
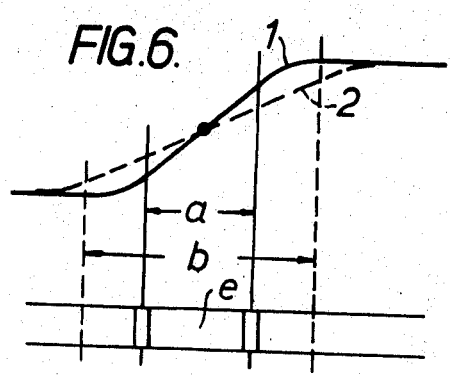

3,570,003
POSITION RESPONSIVE VARIABLE CAPACITOR
Gordon Maurice West, Kirkcaldy, Fife, Scotland, assignor to The Rank Organisation Limited, London, England
Filed Jan. 21, 1969, Ser. No. 792,699
Claims priority, application Great Britain, Feb. 12, 1968, 6,843/68
Int. Cl. H01g 5/14
U.S. Cl. 317—246
12 Claims

ABSTRACT OF THE DISCLOSURE

A capacitive potentiometer in which the electric field is set up by at least two electrical discrete elements disposed in a line and the electrode and elements are movable relatively along such line and wherein the operative electric field passes through only one dielectric to avoid unsymmetrical distortion of the field due to environmental changes.

---

The invention relates to position responsive potentiometric apparatus for determining the relative position or change of relative position of two relatively movable members, or for effecting or controlling a desired relative position of two such members.

This invention relates more particularly to an apparatus responding to the relative position of two relatively movable members and comprising two or more electrically discrete elements disposed adjacently to form a line of elements and an electrode, said elements and said electrode being mounted for movement with respect to each other along the line of said elements and being coupled respectively to said members, and a potential source connected to said elements to establish an electric field whereby to induce on said electrode a potential indicative of its position relative to the elements.

These devices are used in connection with different measuring and/or control circuits permitting to deliver a direct measure of the position of the electrode relative to the line of elements in response to the value of the potential induced on said electrode. These measuring circuits and apparatus will not be described herein since they are not the object of the present invention.

However, this type of potentiometric apparatus has proven to be very sensitive to any environmental action modifying the path and shape of the electrical field between the elements and the electrode, including the path of the end or terminal field of the electrode. It has been shown that particularly moisture did considerably affect the precision of such devices which can therefore not be used for very accurate measurements without a very precise environmental moisture control which cannot be afforded in the most cases where these devices could be used.

The invention provides for an apparatus of the kind mentioned hereabove which tends to remedy to the precited drawbacks by hindering the occurrence of any possible dissymmetrical distortion of the electrical field between the electrode and the line of elements in response to modifications to the environmental conditions and particularly to moisture content changes.

The invention provides further means for fixing both the electrode and the elements on their respective members which suppresses the occurrence of unsymmetrical field distortion in the apparatus due to changes in the environmental conditions particularly changes of moisture content of the dielectric of the capacitive potentiometric device.

The invention will now be described with reference to the accompanying drawings, in which:

FIG. 2 is a cross section along line II—II of FIG. 1.

FIGS. 3 to 5 are schematic longitudinal sectional views of variants of realizations of the capacitive potentiometer in accordance with the invention.

Figure 1:
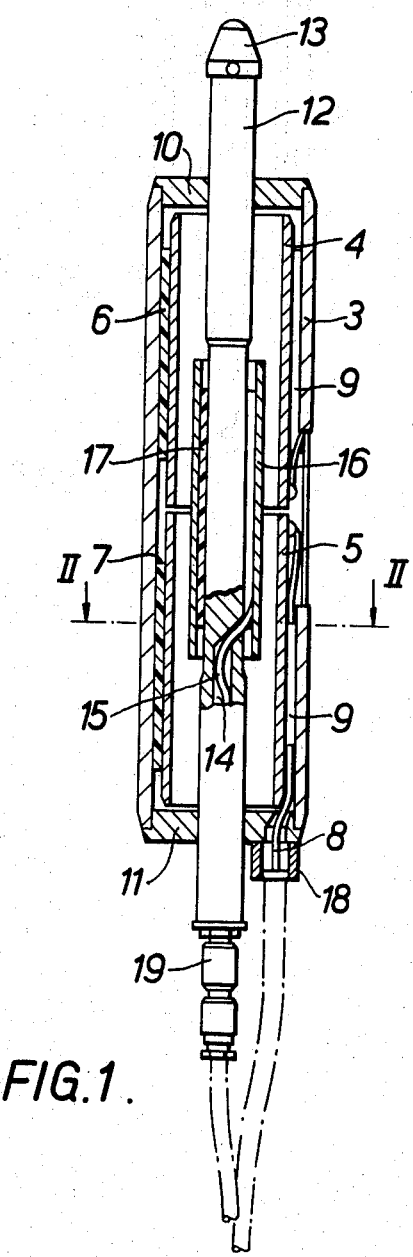
FIG. 1 is a side elevational view partly in section of one embodiment of a capacitive potentiometer in accordance with the invention.

FIG. 6 shows schematically the effect of a change in moisture content in the environment of a known potentiometer on its voltage-position characteristic. The dashed line corresponds to the characteristic curve of a potentiometer modified by an increase of moisture content. The normal characteristic curve of the potentiometer being shown in full line. If the distances are plotted in abscissa and the pick-up voltage in ordinate, in normal conditions (curve 1), the electrical length $a$ of the electrode $e$ corresponds to its mechanical length. As the moisture content increases the characteristic curve flattens (curve 2) and the electrical length $b$ of the electrode increases leading thus to measuring errors which are not neglectable. For example for a ½ inch potentiometer, an error of +141 microinches was measured for a given position of this potentiometer when the moisture content varied from 65% to 90% of relative humidity.

The capacity potentiometer described herein permits to reduce this error to a neglectable value. In fact the same test as mentioned hereabove was carried out with a potentiometer in accordance with the present invention and no error could be measured.

The capacitive potentiometer shown at FIGS. 1 and 2 comprises a housing 3 having a tubular shape of circular cross-section and on the inside surface of which two tubular metallic elements 4, 5 are mounted by means of insulating rings 6, 7. The two tubular elements 4, 5 are electrically distinct and given an electrical potential by means of lines 8 running in grooves 9 provided in the insulating rings 6, 7 and leading to a voltage source.

The ends of the tubular housing are obturated by end plates 10, 11 having central bores coaxial and concentric to the inside surface of the tubular elements 4, 5. An axially movable rod 12 having a cap 13 at one end, is slidably engaged in said bores of the end plates 10, 11. The other end of said rod 12 is provided with a central void 14 to give passage to the lead 15 electrically connected to the pick-up electrode 16 which is fastened, by means of an insulating ring 17 onto the central portion of the rod 12.

Both, the leads 8 and 15 are fastened respectively on the housing 3 and on the rod 12 by means of connectors 18, 19, so that a traction on these lines does not submit their electrical connections to the elements 4, 5 or the electrode 16 respectively to any undue stress.

The electrode 16 is also of tubular shape and is located within the elements 4, 5 coaxially and concentrically. The range of displacement of the electrode, i.e. the rod 12, within the housing is of the same magnitude as the length of either the electrode 16 or one of the elements 4, 5 all three having the same length.

Now with different potentials applied to the elements 4, 5, the potential picked-up capacitively by the electrode 16 depends on its relative position with respect to these elements and therefore gives a measure of the position of the rod 12.

The particular and original feature of this new design resides in the fact that the path of the totality of the electrical field, the central as well as the end fields, between the electrode and the elements crosses only one homogeneous dielectric formed by the ambient air in the present embodiment.

Therefore if there is any change in the dielectric constant due to variation of moisture content for example, the dielectric constant varies equally in all parts of the device where an electrical field is possibly taking place, and further said change is very small in air, so that no detectable effect is caused on the value of the pickup potential whatever the position of the electrode is relative to the elements.

This has been achieved in making the length of the insulating rings 6, 7 mounting the elements 4, 5 and 17 mounting the electrode 16 well smaller than the length of said elements, respectively electrode. Furthermore the gap or clearance existing between the two elements 4, 5 is smaller than either the thickness of the insulating rings 6, 7 as well as of the distance separating the edge of one element and the corresponding edge of the corresponding ring. Thus not even a small percentage of the electrical field present between the electrode and the elements is able to cross another dielectric than air, so that, in the event of a change of dielectric constant of the potentiometer dielectric no distortion of said field occurs.

So the means permitting to avoid a change in the characteristic of this capacitive potentiometer due to changes of environmental conditions are the provision of sufficient air gaps between the edges of the insulating rings 6, 7 and 17 and the corresponding edges of the elements 4, 5 and the electrode 16. In that way the dielectric constant of the said insulating rings 6, 7 and 17 which can vary in response to the absorption of even microscopic amounts of moisture in their material, does not influence any more the working characteristic of the capacitive potentiometer.

FIG. 3 shows schematically a multisegment apparatus in which the electrode 20 is fastened by means of an insulating ring 21 inside a housing 22 and presents a tubular shape. Within this electrode 20 is located an axially movable rod comprising a plurality of elements 23 in line which are disposed concentrically and coaxial with said electrode 20.

Here again the ring 21 fixing the electrode 20 onto the housing 22 has a smaller length than that of the electrode itself to avoid the passage of any electrical field lines, whatever the position of the electrode 20 is with respect to the line of elements 23, through the material forming said ring 21.

In this modification the elements 23 are mounted on an insulating rod 24 which comprises turnings 25 providing for an air gap in the vicinity of adjacent ends of two neighbour elements 23. This provision, if the turning is sufficiently wide and deep, prevents also the passage of any electrical field line through the insulating material of the rod 24.

In order to have a further attenuation of the electrical field, the outside surface of the turnings 25 can be covered by a metallic coating or a metallic ring. Thus the air gap comprised between an element 23 and said metallic cover of the turning 25, increases the attenuation of the electrical field having for effect that this field does not reach the insulating material of the rod 24 so that the dielectric constant of said insulating material may vary without effect on said field.

Therefore here again any changes of dielectric constant due to variations of environmental conditions does not affect the shape of the electrical field, within the potentiometer and therefore has no influence on its precision or characteristic.

FIG. 4 shows another variant of the potentiometric apparatus comprising a housing 27 in which two or more elements (not shown) would be fixed in the same manner as the elements 4, 5 of the embodiment described with reference to FIGS. 1 and 2.

In this variant the electrode 28 is formed of a metallic plug having two longitudinal extensions 29, 30 each secured within a tube 31, 32 respectively, by means of insulating rings 33, 34. Here again the dimensions of the air gaps 35, 36 are such that the electrical field present between the electrode 28 and the elements will not pass through said insulating ring 33, 34 so that the dielectric of the potentiometer is made of air only.

FIG. 5 shows an alternative form for a line of elements to be used in a potentiometric device. Each element 37 has an extension 38 on one end and a recess 39 in the opposite end. These elements 37 are plugged into each other to form a line and maintained together as well as electrically insulated the one from the other by means of insulating rings 40.

The air gaps 41 are again such that no part of the electrical field of the potentiometer crosses the said insulating rings 40.

To be efficient the air gaps provided at the ends of the elements and of the electrode shall have approximatively a depth equal to four times, but in any case greater than two times, their width.

Of course other attempts can be made to counteract the changes in environmental conditions for example the tight sealing of the potentiometric device or the filling of said potentiometric device with a dielectric which acts as a barrier for such environmental changes. In that latter case, oil can be used for example to fill up the potentiometer. However, these solutions are far more expensive than the one consisting of taking out of the paths of the electrical field present in the potentiometer all material acting as a dielectric which is not air.

Furthermore if one has different dielectrics in the potentiometer, and particularly one which gets poor due to the action of moisture, phase shifts are caused which produce measuring errors if a special detector or measuring apparatus is not used. This drawback is completely avoided by the present invention.

It is to be further noted that not only linear potentiometers can be realized according to this invention, but also circular ones. In fact the line of elements can be a straight line or a curved line.

I claim:

1. A position responsive device comprising a capacitive potentiometer, said capacitive potentiometer having at least two electrically discrete elements disposed adjacently to form a line of elements, an electrode, at least one mounting member for said elements and said electrode, insulating members by means of which said elements and said electrode are mounted on said mounting member, said mounting member permitting relative movement of said elements and said electrode in a direction along the line of said elements, a first air gap being defined between said elements and said electrode, means for connecting said elements to a source of electric potential whereby to set up an electric field between said elements and said electrode to induce on said electrode a potential indicative of its position with respect to said elements, second air gaps being defined adjacent each edge of each af said elements and each edge of said electrode in the region of said insulating members, said insulating members being shorter in length than said elements and said electrode carried thereby to provide said second air gaps whereby said electric field between said elements and said electrode crosses no dielectric other than air.

2. The position responsive device of claim 1 wherein said electrode surrounds said line of elements.

3. The position responsive device of claim 2 wherein said insulating member for said elements comprises a rod of dielectric material having recesses or turnings therein between said elements, which recesses or turnings extend past the edges of said elements to form said air gaps.

4. The position responsive device of claim 1 wherein said insulating member for said elements comprises a rod of dielectric material having recesses or turnings therein between said elements which recesses or turnings extend past the edges of said elements to form said air gaps.

5. The position responsive device of claim 1 wherein said line of elements surrounds said electrode.

6. The position responsive device of claim 5 wherein said electrode is in the form of a plug having an axial extension on each of the frontal faces thereof, said mounting member is in the form of a tube and said insulating members, by means of which said electrode is mounted on said mounting member, are in the form of insulating rings by which said extensions are located in said tubular mounting member.

7. The position responsive device of claim 1 wherein said electrode is in the form of a plug having an axial extension on each of the frontal faces thereof, said mounting member is in the form of a tube and said insulating members, by means of which said electrode is mounted on said mounting member, are in the form of insulating rings by which said extensions are located in said tubular mounting member.

8. The position responsive device of claim 1 wherein each of said elements comprises a core, an axial extension on one frontal face of said core, a recess on the other face of said core, insulating rings, said elements being arranged with said extension on said frontal face thereof being located in said recess of said other face of the adjacent element with one of said insulating rings separating adjacent elements to define said second air gaps between adjacent elements.

9. The position responsive device of claim 2 wherein each of said elements comprises a core, an axial extension on one frontal face of said core, a recess on the other face of said core, insulating rings, said elements being arranged with said extension on said frontal face thereof being located in said recess of said other face of the adjacent element with one of said insulating rings separating adjacent elements to define said second air gaps between adjacent elements.

10. The position responsive device of claim 1 wherein said second air gaps have a length equal to at least twice their width.

11. The position responsive device of claim 1 wherein said second air gaps between adqacent ends of adjacent elements have a depth and a length at least equal to twice the distance separating said adjacent ends of said elements.

12. The position responsive device of claim 1, wherein said electrode is movable relative to said line of elements.

References Cited

UNITED STATES PATENTS

| | | | |
|---|---|---|---|
| 3,002,104 | 9/1961 | Mynall | 323—93X |
| 3,219,925 | 11/1965 | Borey | 324—61(S)UX |
| 3,312,892 | 4/1967 | Parnes | 323—93 |

ELLIOT A. GOLDBERG, Primary Examiner

U.S. Cl. X.R.

317—249; 323—93